United States Patent
Renaud et al.

(10) Patent No.: US 7,229,594 B2
(45) Date of Patent: Jun. 12, 2007

(54) DEVICE FOR DISPENSING ACCURATELY-CONTROLLED SMALL DOSES OF LIQUID

(75) Inventors: Philippe Renaud, Préverenges (CH); Alain Donzel, Lausanne (CH)

(73) Assignee: Parabol Technologies S.A., Lausanne (CH)

( * ) Notice: Subject to any disclaimer, the term of this patent is extended or adjusted under 35 U.S.C. 154(b) by 672 days.

(21) Appl. No.: 10/240,031

(22) PCT Filed: Apr. 3, 2001

(86) PCT No.: PCT/IB01/00556

§ 371 (c)(1),
(2), (4) Date: Sep. 26, 2002

(87) PCT Pub. No.: WO01/74490

PCT Pub. Date: Oct. 11, 2001

(65) Prior Publication Data

US 2003/0099577 A1    May 29, 2003

(51) Int. Cl.
*B01L 3/02*      (2006.01)
*G01N 1/10*      (2006.01)
*B65D 83/00*     (2006.01)

(52) U.S. Cl. .................. 422/100; 422/103; 422/93; 436/180; 436/53; 222/335; 222/399

(58) Field of Classification Search ............... 422/99, 422/93, 100, 103; 436/180, 174, 53; 222/321.1, 222/335, 372, 399, 420, 400.5, 402.16

See application file for complete search history.

(56) References Cited

U.S. PATENT DOCUMENTS 4,140,020 A * 2/1979 Cook ....................... 73/864.12

(Continued)

FOREIGN PATENT DOCUMENTS

| EP | 0543544 | 5/1993 |
|---|---|---|
| JP | 0434149 | 6/1991 |
| WO | WO 9942805 | 8/1999 |

OTHER PUBLICATIONS

Copy—11 pages McNeely, et al—"Hydrophobic Microfluidics", 1999 SPIE Article—shown on original Information Disclosure Statement by Applicant—filed with application on Sep. 26, 2002.

*Primary Examiner*—Brian R. Gordon
(74) *Attorney, Agent, or Firm*—Sturm & Fix LLP (57) ABSTRACT

The invention provides a device for dispensing accurately-controlled small quantities of at least one liquid, comprising a liquid supply (L); a gas supply (G), arranged to selectively supply a gas pressure; and a capillary duct (20) adapted to be filled with liquid to be dispensed, and to eject the liquid. The device has a filling configuration wherein liquid from the supply is in contact with an end (20a) of the capillary duct to fill the capillary duct with liquid; and a liquid separation and ejection configuration, in which liquid remaining in the liquid supply is separated from liquid that fills the capillary duct to form a discrete quantity (V) of liquid filling the capillary duct (20) out of contact with the remaining liquid of the liquid supply. The capillary duct, filled with this discrete quantity (V) of liquid then has one end in contact with the gas supply and another end in contact with the atmosphere. The discrete quantity of liquid (V), forming an exact dose of liquid to be dispensed, is ejectable from the second end (20b) of the capillary duct by the application of gas pressure.

12 Claims, 7 Drawing Sheets

U.S. PATENT DOCUMENTS

| | | | |
|---|---|---|---|
| 4,676,274 A | 6/1987 | Brown | |
| 5,095,932 A | 3/1992 | Garrison | |
| 5,108,708 A * | 4/1992 | Hanus | 422/100 |
| 5,150,822 A * | 9/1992 | Eitner et al. | 222/145.1 |
| 5,268,147 A * | 12/1993 | Zabetakis et al. | 422/82 |
| 5,474,744 A * | 12/1995 | Lerch | 422/100 |
| 5,529,756 A | 6/1996 | Brennan | |
| 5,730,323 A * | 3/1998 | Osborne | 222/55 |
| 5,731,212 A | 3/1998 | Gavin | |
| 5,770,158 A | 6/1998 | Eischen et al. | |
| 5,846,393 A | 12/1998 | Clark et al. | |
| 5,957,149 A | 9/1999 | Karg | |
| 5,958,344 A | 9/1999 | Levine et al. | |
| 6,039,211 A * | 3/2000 | Slater et al. | 222/1 |
| 6,117,396 A * | 9/2000 | Demers | 422/100 |
| 6,296,020 B1 | 10/2001 | McNeely et al. | |
| 6,312,960 B1 * | 11/2001 | Balch et al. | 436/518 |
| 6,461,812 B2 * | 10/2002 | Barth et al. | 435/6 |
| 6,482,364 B2 * | 11/2002 | Parce et al. | 422/100 |
| 6,500,323 B1 * | 12/2002 | Chow et al. | 204/450 |
| 6,511,850 B1 * | 1/2003 | Vigh et al. | 436/127 |
| 6,592,825 B2 * | 7/2003 | Pelc et al. | 422/100 |
| 6,641,004 B2 * | 11/2003 | Nielsen | 222/399 |
| 6,709,559 B2 * | 3/2004 | Sundberg et al. | 204/604 |
| 6,740,530 B1 * | 5/2004 | Bruce et al. | 436/180 |
| 6,808,683 B2 * | 10/2004 | Gilbert | 422/100 |
| 6,872,359 B2 * | 3/2005 | Caren et al. | 422/63 |
| 6,875,404 B2 * | 4/2005 | Hirota et al. | 422/100 |
| 6,911,183 B1 * | 6/2005 | Handique et al. | 422/102 |
| 2002/0159918 A1 * | 10/2002 | Tseng et al. | 422/100 |
| 2003/0215957 A1 * | 11/2003 | Lemmo et al. | 436/180 |
| 2003/0228241 A1 * | 12/2003 | Legge | 422/100 |
| 2004/0144648 A1 * | 7/2004 | Jacobson et al. | 204/450 |

* cited by examiner

DEVICE FOR DISPENSING ACCURATELY-CONTROLLED SMALL DOSES OF LIQUID

FIELD OF THE INVENTION

The invention relates to a device for dispensing small quantities of at least one liquid, useful in a number of contexts including the carrying out of various synthesis as well as diagnostic and drug screening applications, particularly those involving biological materials, where there is a need to precisely dose the dispensed liquid.

BACKGROUND OF THE INVENTION

The use of passive capillary valves as a method for controlling fluid flow in a microfluidic system is discussed in "Hydrophobic microfluidics" by McNeely et al, SPIE Conference on Microfluidic Devices and Systems II, Santa Clara, Calif., September 1999, SPIE Vol. 3877-786X/99.

U.S. Pat. Nos. 5,846,396 and 5,958,344 for example describe a liquid distribution system where liquid is dispensed between a connected feeder channel and a reaction cell via a conduit having a capillary barrier interposed to check the flow. Liquid in the feeder channel remains permanently in contact with the liquid in the capillary channel. As a result, the amount of liquid being distributed cannot be controlled accurately.

U.S. Pat. No. 5,957,149 discloses a fluid dispensing device involving spring-biased mechanical valve members, making its structure complex.

The use of syringes to dispense small amounts of liquids is limited by the difficulty of ejecting into the air because of an insufficient speed, and surface tension effects make it difficult to eject small quantities.

A diagnostics system including a mixing structure arranged on a disc is available under the trademark LabCD™ from Gamera Bioscience. Small quantities of liquids are separated and dispensed by selective rotation of the disc, relying on centrifugal force. This system however has severe limitations in its possible applications.

The ejection of small droplets is also known in the area of ink-jet printing and it has been proposed to apply this technique to generate microarrays of liquid droplets for the production of BioChips, by applying a high acceleration to a print module having nozzles filled with different kinds of liquid from different reservoirs (Displayed at Nanotech 99 Conference, Montreux—Switzerland, November 1999, by Ducreel Zengler).

In these ink-jet systems, up to the instant when a droplet is ejected, the liquid in the nozzles to be dispensed remains in contact with the liquid from the reservoir. This leads to imprecision in the amounts of liquid in the ejected droplets. Ink-jet systems are also subject to drawbacks related to evaporation effects and are unsuitable for ejecting highly viscous liquids. Also, ink-jet ejection heads are liable to contamination and possible degradation of the liquid due to heat generation (therefore unsuitable for applications with biological materials) and are not designed to be thrown away.

WO 99/42805 describes a liquid dispensing device for in-situ metering of reagents in a plate, the reagents being supplied from an external source.

EP-A-0434149 describes a liquid dispensing device in which liquid from a pipette is supplied via elongated capillary ducts under control of a rotary valve.

SUMMARY OF THE INVENTION

The invention provides a device for dispensing small quantities of at least one liquid, which is particularly suited for dispensing very accurately controlled small amounts of liquid, is of simple construction and operation and can be integrated easily in automated systems particularly for multiple distribution.

The device according to the invention comprises a liquid supply; a gas supply, arranged to selectively supply a gas pressure; and a capillary duct having open first and second ends. The capillary duct is adapted to be filled with liquid to be dispensed, and to eject said liquid. The capillary duct is dimensioned to favor the capillary flow of a liquid. Typically, the capillary duct has dimensions no wider than about 1.5 mm, preferably no wider than about 500 μm, and possibly no wider than about 250 μm or even 50 μm.

The inventive device has a filling configuration wherein liquid from the supply is in contact with an end of the capillary duct to fill the capillary duct with liquid; and a liquid separation and ejection configuration.

In the liquid separation and ejection configuration, liquid remaining in the liquid supply is separated from liquid that fills the capillary duct to form a discrete quantity of liquid filling the capillary duct out of contact with the remaining liquid of the liquid supply. The capillary duct, filled with this discrete quantity of liquid has its first end in contact with the gas supply and its second end directly or indirectly in contact with the atmosphere. This discrete quantity of liquid is ejectable from the second end of the capillary duct by the application of gas pressure to the first end of the capillary duct.

The invention is characterised in that it comprises an integrated reservoir that constitutes the supply of liquid and is dimensioned to contain a quantity of liquid that can be dispensed as multiple discrete quantities, the diameter or cross-dimension of the integrated reservoir being much greater than the diameter of the capillary duct which extends through a wall that forms a bottom wall of the reservoir. It also comprises a member movably mounted in the device above said wall between a first position defining the filling configuration in which the movable member allows access of liquid in the reservoir to the top part of the wall into which the capillary duct opens, and a second position defining the liquid separation and ejection configuration in which the movable member blocks access of liquid in the reservoir to the top part of the wall into which the capillary duct opens.

The device is so arranged that the ejected quantities each correspond precisely to the discrete quantity that fills the capillary duct in the liquid separation and ejection configuration. Namely, the discrete amount of liquid filling the capillary duct forms an exact dose of liquid to be dispensed, determined by the volume of the capillary channel (usually its diameter and length), less a small and constant volume lost due to surface tension effects. For example, a capillary duct 0.3 mm diameter and 3 mm long provides an ejected dose of 211 nanoliters, less a very small constant and reproducible volume lost by surface tension effects. The same duct with a diameter of 0.1 mm provides an ejected dose of 23 nanoliters. These amounts can be determined very accurately, and remain constant during repeated usage under given conditions. As a result, the invention enables predetermined very precise small amounts of liquids to be dispensed.

The device is moreover very simple. The device with its integral reservoir combines a liquid storage function with the capability of extracting, on demand, sub-microliter samples without the need of pipetting, as in conventional systems.

The part(s) constituting the zone for liquid separation and ejection can be easily produced by simple methods including injection molding and lamination, to form a low-cost disposable nozzle assembly of a liquid dispensing system.

The device can be used to eject fluids containing biological cells without a risk of damaging the cells.

The device is intended principally for use with aqueous solutions and accordingly is provided with hydrophilic surfaces. It could if required be adapted for use with hydrophobic surfaces; this would however require adaptation of the device geometry and the dosing method.

The device can also be used to dispense liquids much more viscous than pure water.

Moreover, the device can be used to recover volumes of precious reagents without loss since the whole amount of liquid can be recovered from the device.

In one embodiment, the first end of the capillary duct branches from a supply duct of much greater diameter, the supply duct having a liquid supply end connected to the liquid supply and a gas supply end connected to the gas supply. This supply duct can have any convenient cross-sectional shape and size, and may even vary in shape and size along its length providing it is much larger than the capillary duct. The movable member is a piston slidably mounted in the supply conduit, the piston separating the liquid and gas supply, the piston being movable between a first position defining the filling configuration and a second position defining the separation and ejection configuration.

Advantageously, the capillary duct and the supply duct are formed in a dispensible nozzle assembly, possibly using a molding and laminating technique.

The device (specifically its nozzle assembly part) can be designed to simultaneously dispense multiple doses of liquid and/or to dispense doses of different liquids successively.

In further embodiments of the invention, the capillary duct is carried by a gas/air supply duct which is movably mounted relative to a liquid reservoir to intake liquid and subsequently eject liquid.

In another embodiment, the liquid supply and the gas supply duct are contained in the movable member arranged for displacement relative to a support which includes the capillary duct, to selectively bring the gas supply duct into or out of alignment with the capillary duct.

The movable member can be generally cylindrical and can be rotatably mounted relative to the support. In this case the gas supply duct can be an eccentric bore parallel to the axis of rotation of the member, which can be brought into or out of alignment with a capillary bore in the bottom of the support by rotation of the member.

Such devices can conveniently be included in an array of the devices actuable in rotation individually or together, forming a "micro-liquid store".

Alternatively, the movable member is a slide plate slidably mounted between opposing stationary plates respectively containing gas supply openings and capillary ducts, the slide plate containing a series of liquid reservoirs and gas supply ducts.

BEST MODES FOR CARRYING OUT THE INVENTION

As shown in FIGS. 1A to 1D and FIG. 2, a device for dispensing small quantities of at least one liquid comprises a supply of liquid L and a supply of gas G arranged to respectively supply the liquid L and gas G (typically air) to opposite ends of a supply duct 10.

A capillary duct 20 having open first and second ends 20a, 20b, branches from the supply duct 10. The capillary duct 20 has a defined length l and a diameter d of capillary dimensions, much smaller than the diameter D (or cross-dimension) of supply duct 10.

The ducts 10, 20 are contained in a body of hydrophilic material, or surface-coated with a hydrophilic material, so they can receive aqueous solutions as well as other solvants.

Figure 1A:
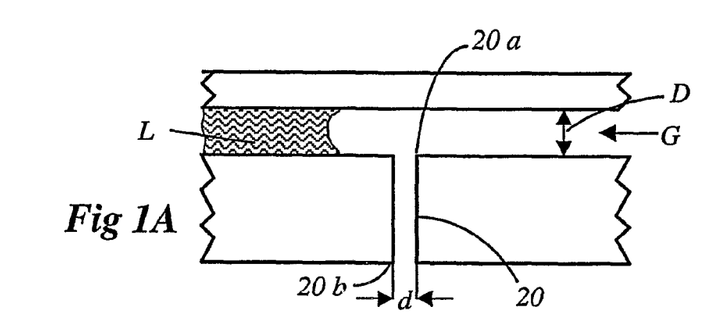
FIGS. 1A to 1D illustrate the principle of operation used in a device according to the invention.
Figure 1B:
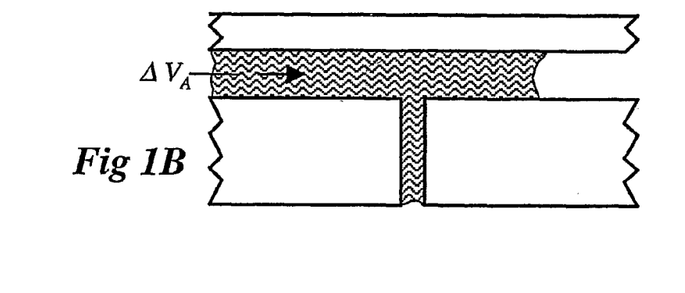
Figure 1C:
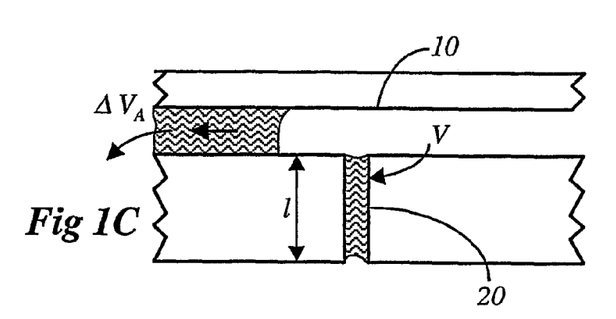
Figure 1D:
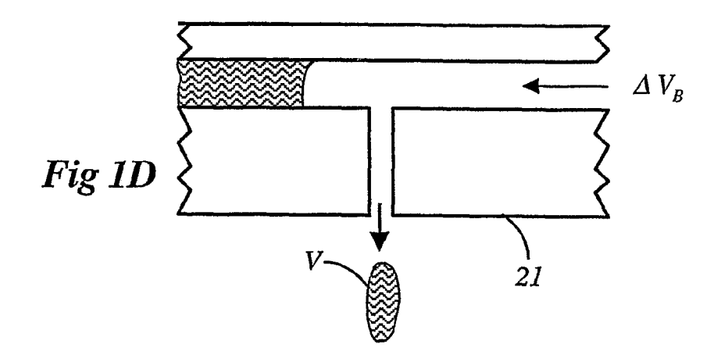

FIG. 1A shows the device in a rest state, after ejection of a quantity of liquid (FIG. 1D). In this rest state, the liquid L from the supply is withdrawn from the first end 20a of the capillary duct. Gas G from the supply is in communication with the ambient atmosphere via the capillary duct 20.

FIG. 1B shows a filling configuration wherein liquid L from the supply is in contact with the first end 20a of the capillary duct 20 which is filled with the liquid L. This is achieved by supplying a volume $\Delta V_A$ of liquid L, as indicated by the arrow, so the liquid completely covers the end 20a of capillary duct 20 and extends along the supply duct 20 on the gas supply side, as shown, the liquid penetrating and filling duct 20 by capillary action.

FIG. 1C shows a liquid separation and ejection configuration, which is reached by withdrawing the volume $\Delta V_A$ of liquid L, as indicated by the arrow, so the liquid L remaining in the liquid supply is separated from liquid that fills the capillary duct 20. The liquid remaining in the duct 20 is held by capillary forces such that a precise volume V of liquid is defined. This volume V forms a discrete quantity of liquid filling the capillary duct 20, out of contact with the remaining liquid L of the liquid supply.

If for example the duct 20 is of circular cross-section, the thus-defined volume is equal to $V = \pi d/2.l - e$ where e is the reduction of volume produced by the curvature of the liquid at the ends of duct 20. The reduction of volume e is very small and depends essentially on the tension induced by the shape, the angle of contact of the material and the surface tension of liquid L. For given conditions, e is therefore constant and reproducible.

In the liquid separation and ejection configuration of FIG. 1C, the volume V of liquid in duct 20 can be ejected from its second end 20b upon the abrupt application of a gas pressure to the first end 20a of the capillary duct 20, by supplying a pulsed volume $\Delta V_B$ of air from the gas supply end, as illustrated in FIG. 1D. At this stage, the liquid L in the supply duct 10 is held by pressure in the liquid supply and hence does not move. Consequently, the volume V of liquid in the capillary channel 20 is ejected into the ambient air, initially as a jet which will form into one or more droplets according to the volume V and the ejection conditions. FIG. 1D illustrates a single droplet of volume V being ejected.

In order to avoid any unwanted deposit of ejected liquid on the face 21 in the plane of the second end(s) 20b of the capillary channel(s) 20, it can be advantageous to treat this face 21 to render it hydrophobic.

Once the volume V of a liquid has been ejected, the device is back in its rest state shown in FIG. 1, ready for a new ejection cycle. The ejection operation can then be repeated indefinitely as long as the supply of liquid L is sufficient, or is replenished to compensate for losses.

Figure 2:
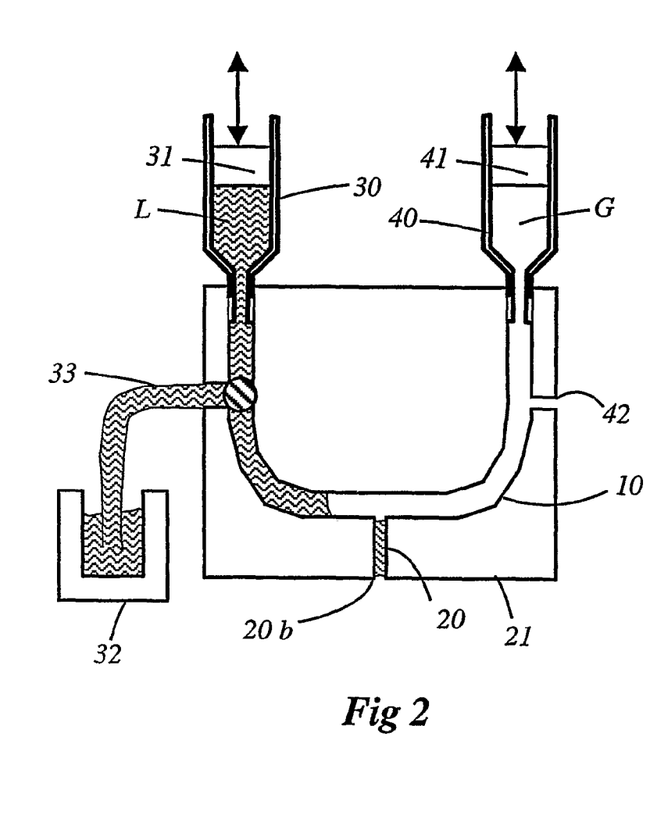
FIG. 2 is an overall view of a comparative device operating according to the same principle.

FIG. 2 shows a comparative device in which the supply duct 10 leads, at the liquid supply end, to a liquid-dosing mechanism such as a syringe 30 fitted with a piston 31, and at the gas supply end to a cylindrical air reservoir 40 fitted with a piston 41.

The liquid dosing mechanism is capable of displacing a selected volume $\Delta V_A$ of liquid in both directions by moving the piston 31 in or out. The liquid supply part of duct 10 is connected to an external liquid reservoir 32 by a siphon 33 to compensate for liquid losses. Liquid L can be replenished in the reservoir 32 when necessary or desired.

The piston 41 of the air-supply line is actuable sufficiently rapidly to abruptly displace a sufficient volume $V_B$ of air to eject the volume V of liquid from the end 20b of the capillary duct 20, forming an ejection nozzle. A small air-vent 42 is provided in the air-supply part of duct 10 to equalize the pressure during the relatively slow displacement of liquid L. This air-vent 42 is however sufficiently small to avoid a too-great pressure drop when the piston 41 is actuated.

Figure 3:
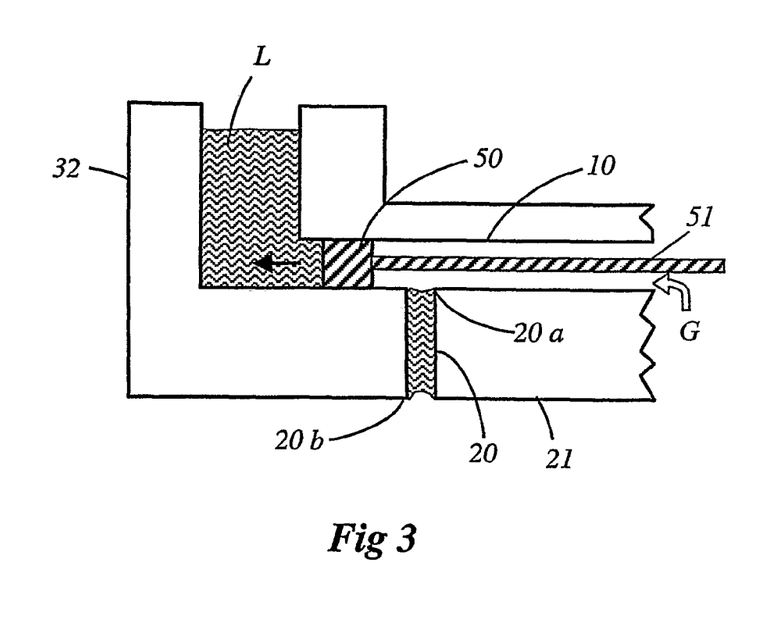
FIG. 3 illustrates an embodiment of a device according to the invention fitted with a piston.

FIG. 3 shows an embodiment of a device according to the invention further comprising a piston 50 (preferably hydrophobic) slidably mounted in a supply conduit 10 which leads into a reservoir 32 containing the liquid L. As shown, the reservoir 32 is integrated in the device, the capillary duct 20 extending through a wall which is an extension of the bottom wall of reservoir 32. The piston 50 separates the supplies of liquid L and gas G, and is movable between a first position (not shown) defining the filling configuration and a second position (shown in FIG. 3) defining the separation and ejection configuration of the device.

In its first position, the piston 50 is withdrawn by its actuating rod 51, so the liquid L covers the first end 20a of the capillary duct 20, like in FIG. 1B, and the capillary duct 20 is filled with liquid L by capillary action.

By displacing the piston 50 to the FIG. 3 position, the liquid L is driven back towards the reservoir 32 so the first end 20a of capillary duct 20, filled with a discrete volume V of liquid which is separated from the liquid L remaining in the supply from reservoir 30, is in contact with the gas G from the supply. By then applying an abrupt gas pressure, the volume V of liquid can be ejected from the second end 20b of the capillary duct 20, like in FIG. 1D. For this the gas supply end is provided with a device like the air-reservoir 40/piston 41 of FIG. 2.

The piston 50 can then be returned to the first position, and the dispensing cycle repeated.

Figure 4:
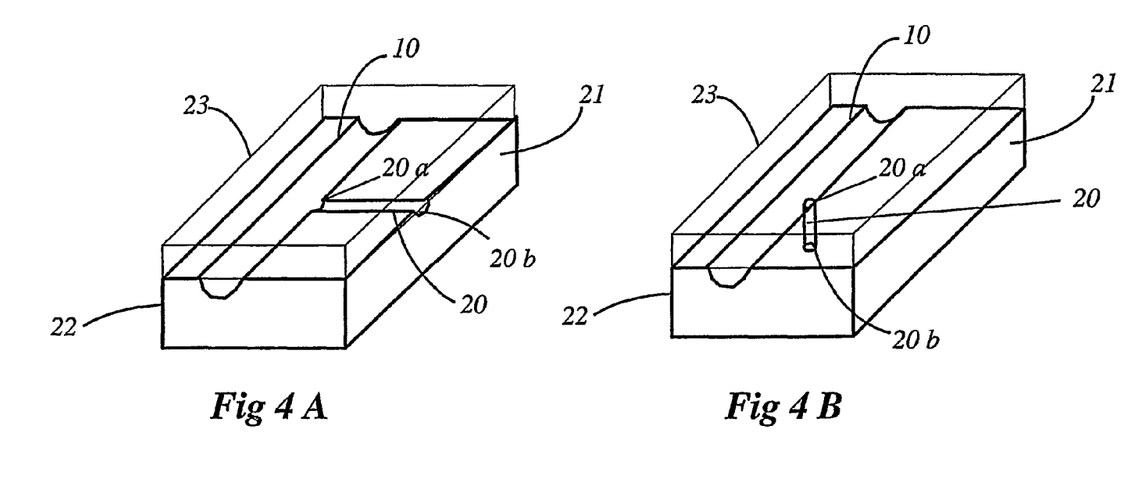
FIGS. 4A and 4B show further variations.

FIGS. 4A and 4B show two arrangements in which the supply duct 10 and the capillary duct 20 are formed in a dispensible nozzle assembly. In both these Figures, a supply duct 10 of generally semi-circular cross-section is formed by covering a rectangular block 22 of molded plastics material with a laminated film 23. The supply duct 10 is defined by a recess of generally semi-circular section molded, machined or engraved in a top face of block 22.

In FIG. 4A, a capillary duct 20, also of generally semi-circular cross-section, is defined in the top face of block 22, its first end 20a leading into the supply duct 10 and its second end 20b leading into an outside face 21 on the side of the assembled block 22/23, forming a dispensing nozzle for lateral ejection.

In FIG. 4B, a capillary duct 20, of circular cross-section, leads from its second end 20b in the bottom face 21 of the block 22 to its first end 20a leading into the supply duct 10 about mid-way therealong. Its second end 20b thus forms a dispensing nozzle for vertical ejection from the main block face.

In such embodiments, where the main supply duct 10 is defined on one side by a laminated film 23, the pressure generation mechanism can be arranged to apply a local force against a part of the laminated film 23 overlying the supply duct 10.

Of course, other designs of dispensable nozzle assemblies are possible. The lamination technique in particular enables the capillary ducts 20 to be configured in a non-linear arrangement.

Figure 5:
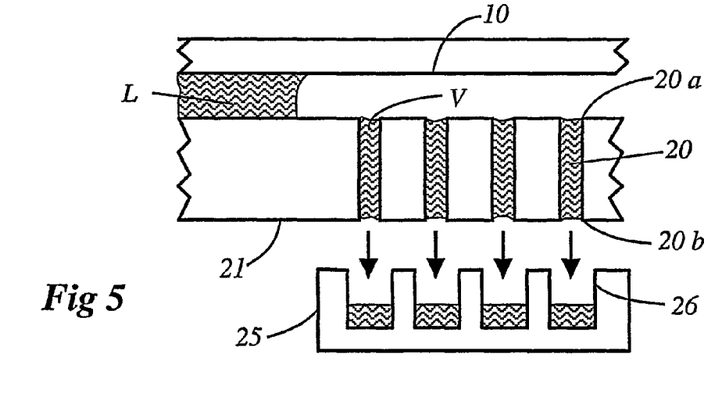
FIG. 5 is a partial view of an arrangement providing multiple dosing.

As illustrated in FIG. 5, devices like the previous ones can be designed to simultaneously dispense multiple doses of liquid at predetermined locations. Such a device comprises several capillary ducts 20 branched from a single supply duct 10. Four capillary ducts 20 are shown for illustrative purposes, arranged so that in the filling configuration liquid L from the liquid supply comes into contact with the first ends 20a of all the capillary ducts 20 to fill them each with liquid. In the liquid separation and ejection configuration, shown in FIG. 5, liquid L remaining in the liquid supply is separated from the discrete volumes V of liquid that fill the capillary ducts 20. Thus, the capillary ducts 20 all filled with their discrete volumes V of liquid have their first ends 20a simultaneously in contact with the gas supply and their second ends 20b in contact with the atmosphere. The discrete volumes V of liquid in the capillary ducts 20 are then all ejectable simultaneously from the second ends 20b by the application of gas pressure to the first ends 20a, the ejected liquid being received in a collection tray 25 having a corresponding number of cavities 26 in alignment with the capillary ducts 20.

Figure 6A:
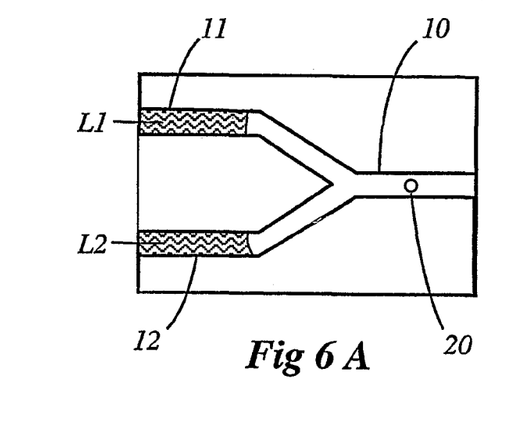
FIGS. 6A to 6C illustrate the operation of a varied device according to the invention for dispensing small quantities of two different liquids.
Figure 6B:
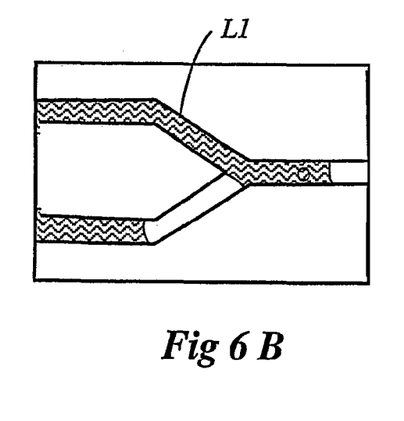
Figure 6C:
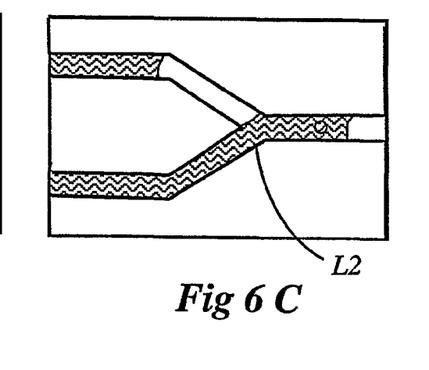

This device is particularly adapted for filling trays having an array of multiple cavities 26, such as for example 48×32 cavities, each of which may have a volume less than 10 microliters. For such an array of 1536 cavities, the space between cavities is conveniently of the order of 2.25 mm, which corresponds to the space between the capillary ducts 20. For multiple dosing, it can be envisaged to provide a line (or several lines) of eight, sixteen or thirty-two capillary ducts 20 forming the ejection nozzles. Especially for large numbers of ejection nozzles, precautions will be taken to balance the air pressure during ejection.

Where it is desired to dispense doses of different liquids successively the device, as shown in FIGS. 6A to 6C, can have a supply duct 10 with two (or more) liquid supply sections 11 and 12 connected to respective liquid supplies L1 and L2 and branched together to a single gas supply section 10. The capillary duct 20 is branched from this gas supply duct 10. The supplies of liquid (and subsidiarly the supply of gas) are arranged to bring liquid L1 or L2 from a selected liquid supply section 11 or 12 into the supply duct 10 over the first end 20a of capillary duct 20 for the ejection of a discrete quantity of the selected liquid, according to the previously-described mechanism.

As shown in FIG. 6B, liquid L1 is firstly brought to cover and fill the capillary duct 20, the liquid L1 is subsequently retracted and the dose of liquid L1 in duct 20 ejected by the application of air pressure. After the liquid L1 has been retracted, liquid L2 can be brought to cover and fill the capillary duct 20, as shown in FIG. 6C, the liquid L2 is then retracted and the dose of liquid L2 subsequently ejected. In this way, small quantities of any convenient number of different liquids can be successively ejected.

Figure 7A:
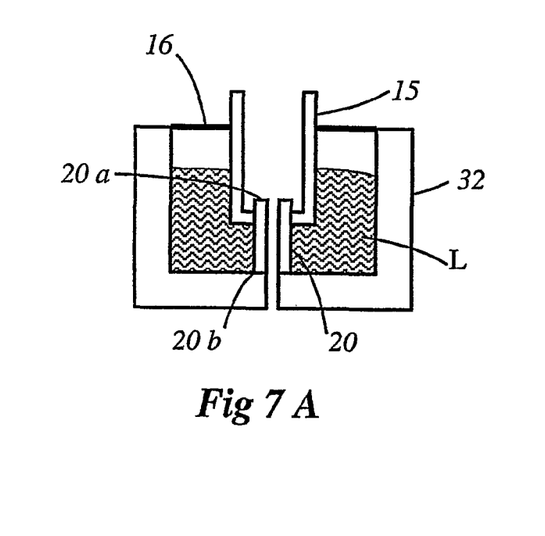
FIGS. 7A to 7C illustrate another embodiment of device according to the invention where the capillary duct is movably mounted for dispensing small quantities of a liquid.
Figure 7B:
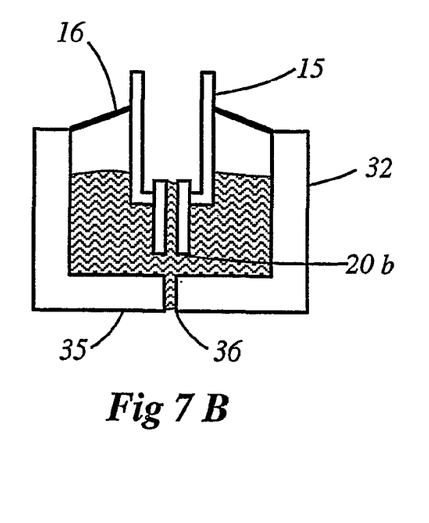
Figure 7C:
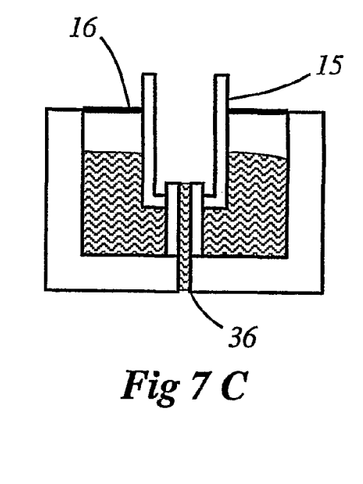

Another embodiment of device according to the invention shown in FIGS. 7A to 7C comprises a capillary duct 20 mounted at one end of a gas supply duct 15 of much greater diameter. The first end 20a of the capillary duct 20 is inside the gas supply duct 15. The second end 20b of capillary duct 20 protrudes from the end of gas supply duct 15. The liquid supply comprises a reservoir 32 containing liquid L. The gas supply duct 15 with its attached capillary duct 20 is movably mounted in the reservoir 32 and connected by means of an elastic membrane 16 to the top of the reservoir's walls.

In a first position shown in FIG. 7B, the gas supply duct 15 is lifted up so the end 20b of capillary duct 20 is in communication with liquid L in the reservoir 32 so it can intake liquid L. This position thus defines the filling configuration.

The reservoir 32's bottom wall 35 has therein a capillary opening 36 in extension of the capillary duct 20. This capillary opening 36 preferably has the same diameter as the capillary duct 20, and is also filled with liquid L when the capillary duct 20 is lifted to its filling position.

In a second position, defining the separation and ejection configuration, shown in FIG. 7C, the gas supply duct 15 is lowered under the action of the elastic membrane 16 until the second end 20b of capillary duct 20 comes to abut against the inside face of the bottom 35 of reservoir 32, in extension of the capillary opening 36. In this position, the capillary duct 20 and the capillary opening 36 together contain a predefined dose of liquid L to be ejected, and which is separated from the liquid in the reservoir 32.

This predefined dose of liquid L can then be ejected from the opening 36 by applying air pressure via the supply duct 15 and capillary duct 20. After ejection, the device is back in the rest position of FIG. 7A, ready to carry out another ejection cycle.

Figure 8:
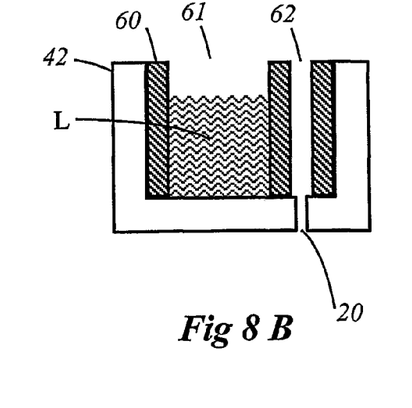
FIGS. 8A and 8B illustrate a variation of the device of FIG. 3, adapted for rotational actuation.

FIG. 8 illustrates a variation of the dispenser device shown in FIG. 3. FIG. 8A is a top view and FIG. 8B is a cross section of the device. Now, the piston 50 is replaced by a circular insert 60 that comprises two cavities 61 and 62. This insert 60 is rotatably mounted in a cylindrical well defined in the support 42 so it can be rotated by an external actuator. The main cavity 61 constitutes an integral reservoir that is filled with the liquid L to be stored in the device and dispensed. Sealing is achieved by pressing the insert 60 in the bottom of the well. A second, smaller cavity 62 is defined in the insert, next to the main cavity 61. The capillary 20 is defined in the bottom wall of the support 32, directly below the secondary cavity 62 which serves as gas supply duct.

The insert 60 is moved by an external mechanical device, not shown. This could consist of a fork or yoke actuated by a motor that engages with the insert 60 to apply a torque.

Figure 9:
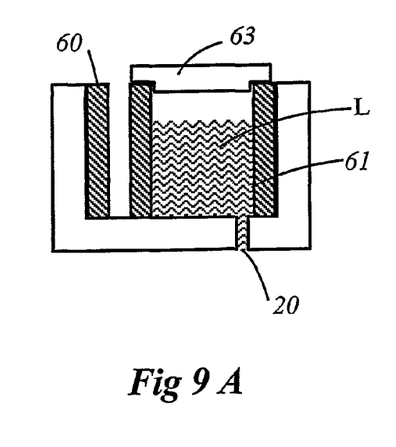
FIGS. 9A, 9B and 9C illustrate the device of FIGS. 8A and 8B, fitted with an optional cover, in different operational states.

FIG. 9 illustrates the principle of operation. In a first rotary movement through an angle of 180° (from the liquid-ejection position of FIG. 8B to the filling position of FIG. 9A), the main reservoir 61 is moved over the capillary 20 that is immediately filled by capillary forces as described before. Then, the insert 60 is turned back in its original position (FIG. 9B), leaving the capillary 20 filled with a well-controlled dose of liquid. In the last step, a pressure pulse 64 can be applied through the secondary cavity 62, causing the ejection of the liquid dose 65. The connection to the pressure pulse generator could be obtained by simply pressing tubing on top of the cavity 62. The dosing and ejection process can be repeated as many times as necessary for ejecting several doses of the same liquid.

In order to prevent the evaporation or the contamination of the liquid, a hermetic lid 63 can be placed and clamped onto the main cavity 61, as shown in FIGS. 9A–9C.

Figure 10:
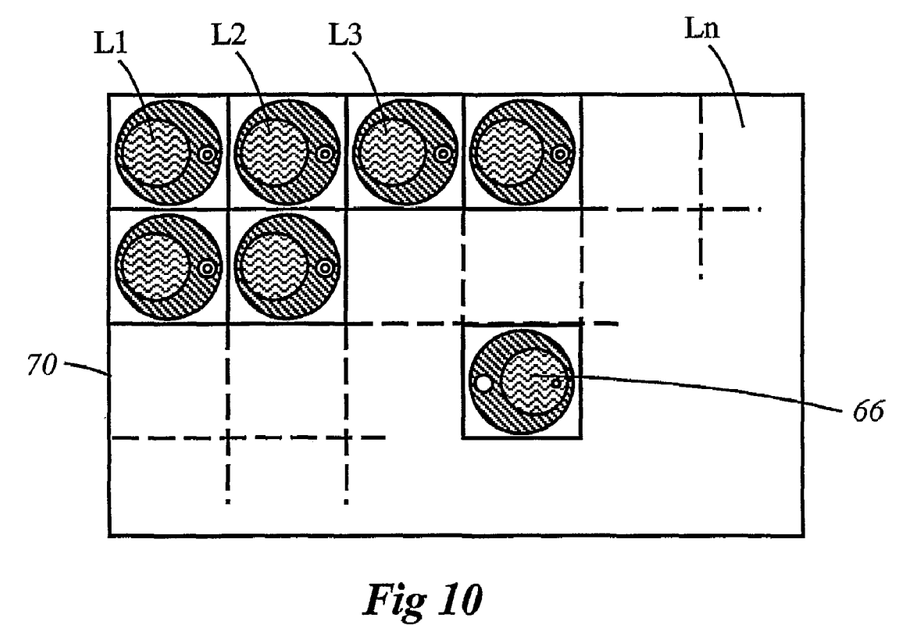
FIG. 10 illustrates an array of devices like that of FIGS. 8A and 8B.

Devices as shown in FIG. 8 can be placed in a one-dimensional array or a two dimensional array such as shown in FIG. 10, for instance in a standard format of well plates used in laboratory automation (96 well plates, or other formats).

FIG. 10 shows identical devices placed on a two-dimensional array 70 of n×n devices. The reservoirs are filled with different liquids L1, L2, . . . Ln. Each device can be rotated and actuated individually as indicated at 66 to extract a given sample from the plate.

This device is called a "micro-liquid store". It has the unique advantage of combining a liquid storage function, as done in conventional laboratory automation well plates, with the capability of extracting, on demand, sub-microliter samples without the need of pipetting (as done in conventional systems).

Instead of individual activation, all the wells could be activated at the same time: this allows "copying" the plate rapidly and without losing precious reagents since it is directly extracted from the plate.

Figure 11A:
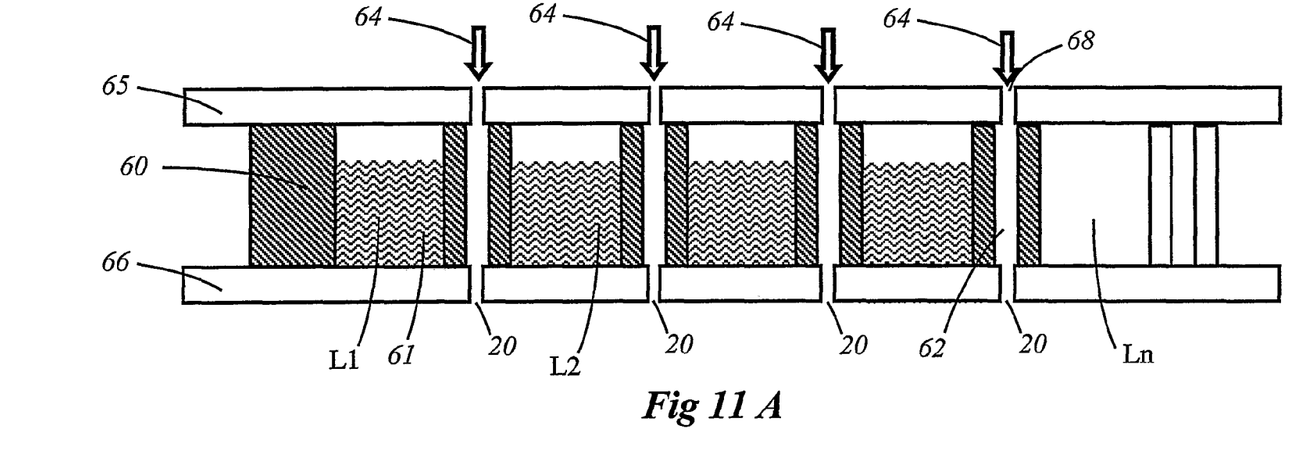
FIGS. 11A and 11B illustrate a modified device with linear displacement.

As illustrated in FIG. 11, the device can have an insert movable by linear displacement, which is suited for collective actuation. FIG. 11A shows the arrangement of a row (or a two-dimensional array) of an insert 60 in the form of a plate having a series of reservoirs 61 and secondary cavities 62 slidably placed between two stationary plates 65,66. The bottom plate 66 contains the capillaries 20. The top plate 65 constitutes a lid and has openings 68 that are placed, when the device is in a rest position, over the secondary cavities 62, as described in connection with FIG. 8. These openings 68 are connected to a pressure pulse generator 64. The array can be filled with different liquids L1, L2, . . . Ln.

Figure 11B:
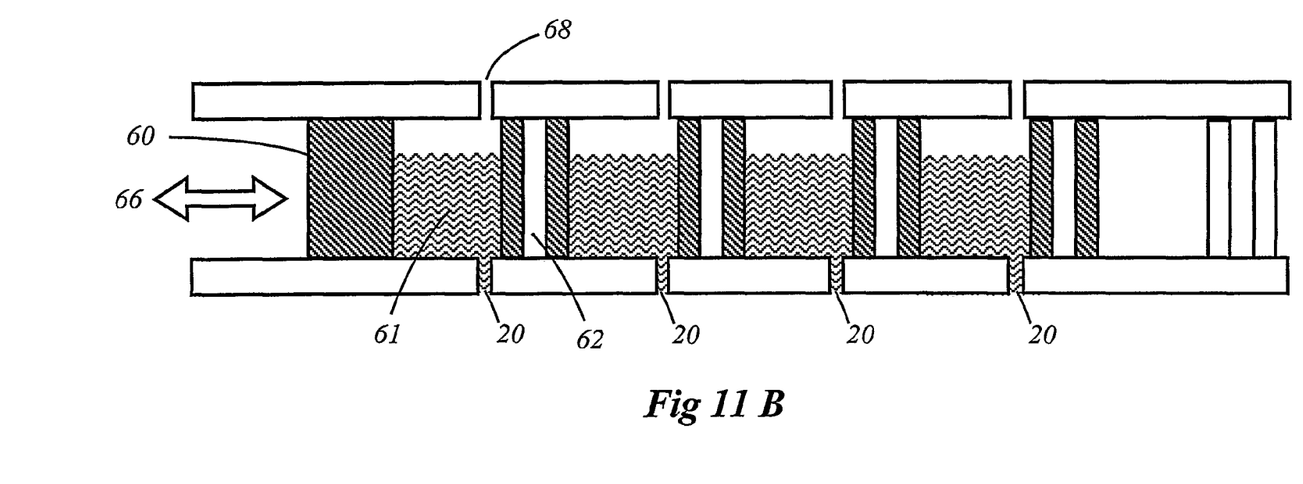

In FIG. 11B, the filling is obtained by moving laterally the central plate 60 as indicated by arrows 66 in order to place the liquids over the capillaries 20. Then the plate 60 in moved back to its original position, leaving the capillaries 20 filled with a controlled dose of liquid. Next, the pressure pulse can be applied (as shown in FIG. 11A) to eject the liquid dose.

This configuration has the advantage of being hermetic. The main liquid reservoir can be filled before placing the top cover 65 or through additional holes in this cover 65. Various embodiments of the invention have been described by way of example, it being understood that modifications can be made within the scope of the claims. In particular, it is possible to combine the described features, such as the provision of multiple ejection nozzles for simultaneous ejection, and the provision of branched liquid supply lines for the successive ejection of different liquids, with other described embodiments.

The invention claimed is:

1. A device for dispensing small quantities of at least one liquid, comprising: a reservoir (32;61) that constitutes a supply of liquid (L) to be dispensed; a gas supply duct (10; 15;32;62) connectable to a gas supply (G), arranged to selectively supply a gas pressure; a capillary duct (20) having open first and second ends (20a, 20b), the capillary duct being adapted to be filled with liquid (L) to be dispensed, and to eject said liquid; a wall that forms a bottom wall of the reservoir (32;61), the capillary duct (20) extending through the thickness of said wall whereby the reservoir is integrated with the liquid-dispensing capillary duct; and a movable member (50;15,20,42) movably mounted in the device above said bottom wall of the reservoir (32;61) between a first position defining a filling configuration and a second position defining a liquid separation and ejection configuration, wherein:

(a) in the filling configuration the movable member (50; 15,20,42) allows access of liquid in the reservoir to the top part of the wall into which the capillary duct (20) opens whereby liquid from the reservoir (32;61) is in contact with an end (20a) of the capillary duct (20) to fill the capillary duct with liquid; and (b) in the liquid separation and ejection configuration:

the movable member (50; 15,20,42) blocks access of liquid in the reservoir (32;61) to a top part of the wall into which the capillary (20) duct opens, so liquid remaining in the reservoir (32;61) is separated from liquid that fills the capillary_duct (20) to form a discrete quantity (V) of liquid filling the capillary duct out of contact with the remaining liquid (L) of the reservoir;

the capillary_duct, filled with said discrete quantity (V) of liquid has its first end (20a) in contact with the gas supply and its second end (20b) directly or indirectly in contact with the, atmosphere; and said discrete quantity (V) of liquid is ejectable from the second end (20b) of the capillary duct by the application of gas pressure to the first end (20a) of the capillary duct when the gas supply duct is connected to said ~as supply (G), the integrated reservoir (32;61) being dimensioned to contain a quantity of liquid (L) that can be dispensed as multiple discrete quantities (V), a diameter or cross-dimension of the integrated reservoir (32;61) being greater than the diameter of the capillary duct (20) which extends through the thickness of said wail; and the device being so arranged that the ejected quantities each correspond precisely to the discrete quantity (V) that fills the capillary duct (20) in the liquid separation and ejection configuration.

2. The device of claim 1, wherein the first end (20a) of the capillary duct branches from a liquid and gas supply duct which is of greater diameter than the capillary duct, the liquid and gas supply duct having a liquid supply end connected to the liquid supply (L) and a gas supply end (10) connectable to the gas supply (G), wherein said movable member is a piston (50) slidably mounted in the liquid and gas supply duct, the piston separating the liquid and gas supply, the piston being movable between a first position defining said filling configuration and a second position defining said separation and ejection configuration.

3. The device of claim 2, which comprises a dispensing nozzle that incorporates the capillary duct (20) and the liquid and gas supply duct.

4. The device of claim 2, comprising a plurality of capillary ducts (20) branched from the liquid and gas supply duct, wherein in the filling configuration liquid from the liquid supply (L) is in contact with an end of each capillary duct (20) to fill each capillary duct with liquid, and in the liquid separation and ejection configuration:

liquid remaining in the liquid supply (L) is separated from liquid that fills each capillary duct (20) to form a discrete quantity (V) of liquid filling each capillary duct out of contact with the remaining liquid of the liquid supply;

each capillary duct (20), filled with its discrete quantity (V) of liquid, has its first end (20a) in contact with the gas supply duct (10) and its second end (20b) in contact with the atmosphere; and said discrete quantities (V) of liquid in the capillary ducts (20) are ejectable simultaneously from the second ends (20b) of the capillary ducts by the application of gas pressure to the first ends (20a) of the capillary ducts.

5. The device of claim 2, wherein the liquid and gas supply duct has at least two liquid supply sections connected to respective liquid supplies (L1, L2) and branched together to a gas supply section from which the capillary duct (20) is branched, said liquid supplies being arranged to control liquid in the liquid supply sections to bring liquid from a selected liquid supply section over the first end (20a) of the capillary duct for the ejection of a discrete quantity of the selected liquid.

6. The device of claim 1, wherein the capillary duct (20) further comprises a movable part of the capillary duct that is carried by the gas supply duct (15), the gas supply duct being movably mounted relative to the liquid reservoir (L) between a position in which the movable part of the capillary duct is aligned with but spaced from the capillary duct in said bottom wall for intaking liquid and a position in which the movable part of the capillary duct is aligned with and against the capillary duct in the bottom wall for subsequently ejecting liquid.

7. The device of claim 6, wherein the movable part of the capillary duct (20) is mounted at an end of a gas supply duct (15) of greater diameter, with the first end (20a) of the movable part of the capillary duct leading inside the gas supply duct (15) and the second end (20b) of the movable part of the capillary duct protruding from the gas supply duct, said liquid supply comprising a reservoir (32) of liquid (L), the gas supply duct (15) being movably mounted in the reservoir and movable between a first position defining said filling configuration wherein the second end (20b) of the capillary duct is in communication with liquid (L) in the reservoir, and a second position defining said separation and ejection configuration, wherein in its second position the movable part of the capillary duct (20) abuts by its second end (20b) against a wall of the reservoir (32), the reservoir having a capillary opening (36) in extension of the movable part of the capillary duct (20) such that in said filling configuration a discrete quantity of liquid to be dispensed is contained in the movable part of the capillary duct (20) extended by said capillary opening (36).

8. A device according to claim 1, further comprising a support (42) which has a bottom wall including the capillary duct (20), wherein the liquid supply reservoir (61) and the gas supply duct (62) are contained in said movable member (60) which is arranged for displacement relative to the support (42) to selectively bring the gas supply duct (62) into or out of alignment with the capillary duct (20).

9. The device of claim 8, wherein the movable member (60) is generally cylindrical and is rotatably mounted relative to the support (42); the gas supply duct (62) is an eccentric bore parallel to the axis of rotation of the member (60), and the support (42) has a bottom with the capillary bore (20) with which the gas duct (62) can be brought into or out of alignment by rotation of the member (60).

10. An assembly comprising an array of the devices as claimed in claim 9, which devices are actuable in rotation individually or together.

11. The device of claim 8 wherein the movable member is a slide plate (60) that is slidably mounted between opposing stationary plates (65, 66) respectively containing gas supply openings (62) and capillary ducts (20), the slide plate (60) containing a series of liquid reservoirs (L1, L2, . . . ) and gas supply ducts (62).

12. The device of claim 1, further comprising a gas supply (G) connected to the gas supply duct (10;15;32;62) and arranged to supply a gas pressure to the gas supply duct.

\* \* \* \* \*